UNITED STATES PATENT OFFICE.

FELIX KUNERT, OF OFFENBACH-ON-THE-MAIN, GERMANY, ASSIGNOR TO THE CORPORATION OF CHEMISCHE FABRIK GRIESHEIM-ELEKTRON, OF FRANKFORT-ON-THE-MAIN, GERMANY.

DYEING ARTIFICIAL SILK.

1,169,267. Specification of Letters Patent. Patented Jan. 25, 1916.

No Drawing. Application filed August 5, 1914. Serial No. 855,305.

*To all whom it may concern:*

Be it known that I, FELIX KUNERT, citizen of the German Empire, and resident of Offenbach-on-the-Main, in the Grand Duchy of Hesse, Germany, have invented new and useful Improvements in Dyeing Artificial Silk, of which the following is a specification.

In a number of U. S. patents there are described dyestuffs, obtainable by combining a diazo-, tetrazo- or diazo-azo compound not containing a sulfo group with an arylamid of 2:3-oxynaphthoic acid, and processes for using these products for the production of fast shades on cotton.

Now I have invented an improvement in the art of producing ice colors on artificial silk by using the above mentioned dyestuffs, consisting in impregnating artificial silk with a solution of an arylamid of 2:3-oxynaphthoic acid and treating it with a non-sulfonated diazo compound. Under the term non-sulfonated diazo compound I include all diazo-, tetrazo- or diazo-azo-compounds, not containing a sulfo group. A non-sulfonated diazo compound is specified because sulfonated diazo bodies produce colors which are insufficiently fast to water. Since by this process it is not necessary to dye the goods at a high temperature, medium and dark shades being producible at a moderate temperature, and since on the other hand the goods which have been impregnated with a solution of an arylamid of 2:3-oxynaphthoic acid can be developed with diazo compounds while wet, that is to say without being dried, the artificial silk is excellently preserved. This constitutes a great industrial advance.

The process is applicable to all kinds of artificial silk, for instance to viscose, Elberfeld, which is a copper oxid-ammonia artificial silk and nitrocellulose silks.

In order to illustrate the new process more fully the following examples are given:

*Example I—Production on viscose silk of the dyestuff obtained by combining diazotized paranitro-ortho-toluidin with the anilid of 2:3-oxynaphthoic acid.*—The viscose silk is first passed through water heated to about 60° C. and then impregnated with a solution of the anilid of 2:3-oxynaphthoic acid at about 30–40° C. For this purpose the viscose silk is well handled 3 or 4 times in an earthen pot and centrifugated. After the goods have completely cooled, they are introduced in a wet condition, that is to say without being dried, into the dye-bath containing the diazo compound, handled several times, then washed, soaped and brightened with acetic, formic or tartaric acid. The requisite solutions are made as follows:

*Padding solution of the anilid of 2:3-oxynaphthoic acid.*

| | Medium shades. | Dark shades. |
|---|---|---|
| Anilid of 2:3-oxynaphthoic acid | 40 gr. | 60 gr. |
| Caustic soda lye, 34° Baumé | 68 cc. | 100 cc. |
| Ricinoleate of soda or the sodium compound of Turkey red oil. | 75 gr. | 100 gr. |
| Made up to | 10 liters. | 10 liters. |

The anilid of 2:3-oxynapthhoic acid is stirred with the caustic soda lye and the ricinoleate of soda or the sodium compound of Turkey red oil, then covered with hot water, boiled and made up to the desired quantity.

*Diazo solution.*—300 grams of paranitro-ortho-toluidin are stirred with 600 cc. of hydrochloric acid 20° Baumé and dissolved in 2000 cc. of boiling water; to the cooled solution are added 1500 grams of ice, and 156 grams of sodium nitrite, dissolved in 500 grams of water, are allowed to run in slowly in a thin stream, while stirring continuously; the whole is then made up with cold water to 10 liters.

*Dye-bath.*—2.5 liters of the above described diazo solution are filtered through calico and mixed with 7.5 liters of cold water, and shortly before dyeing 250 cc. of a solution of sodium acetate (1:1), are added.

For a subsequent treatment the following solution may be made:—2.5 liters of the diazo solution are mixed with 3.75 liters of cold water, and 250 ccm. of a solution of sodium acetate (1:1) are added.

In this manner scarlet red tints of very great brightness and excellent fastness, are obtained; on Elberfeld silk darker shades are obtained by using the same concentration of the baths, the darkest are the tints on Tubize silk. The term "Tubize silk" is commonly employed in the art to designate nitrocellulose artificial silk.

*Example II—Production on Elberfeld artificial silk of the dyestuff obtained by combining diazotized meta-amino-azo-toluene with the anilid of 2:3-oxynaphthoic acid.*—The Elberfeld silk is impregnated with a solution of the anilid of 2:3-oxynaphthoic acid as described in Example I and dyed in the same manner in a dye-bath of the following constitution:—

*Diazo solution.*—450 grams of meta-amino-azo-toluene are mixed with 600 cc. of boiling water and 156 grams of sodium nitrite dissolved in 400 cc. of cold water are added. This paste is poured, while stirring continuously, into a mixture of 4000 grams of ice, 2000 cc. of water and 600 cc. of hydrochloric acid 20° Baumé, and the whole is made up to 10 liters.

*Dye-bath.*—2.5 liters of the above described diazo solution are mixed with 7.5 liters of cold water, and shortly before dyeing 300 cc. of a solution of sodium acetate (1:1), are added.

For a subsequent treatment the following solution may be made: 2.5 liters of diazo solution are mixed with 3.75 liters of cold water, and 300 cc. of a solution of sodium acetate (1:1) are added.

In this manner bright dark red shades are obtained.

On viscose silk a little lighter, on Tubize silk darker, tints are obtained by using the same concentration of the baths.

*Example III—Production on Tubize silk of the dyestuff obtained by combining diazotized meta-nitro-ortho-anisidin with the meta-nitro-anilid of 2:3-oxynaphthoic acid.*—The Tubize silk is impregnated with the following

*Padding solution made from the meta-nitranilid of 2:3 oxynaphthoic acid.*

|  | Light shades. | Medium shades. | Dark shades. | Intensely dark shades. |
|---|---|---|---|---|
| Meta-nitranilid of 2:3-oxynaphthoic acid. | 7.5 gr... | 20 gr.... | 40 gr.... | 60 gr. |
| Caustic soda lye 34° Baumé. | 13 cc.... | 35 cc.... | 67 cc.... | 100 cc. |
| Ricinoleate of soda or the sodium compound of Turkey red oil. | 30 gr.... | 60 gr.... | 100 gr... | 150 gr. |
| Formaldehyde of 30% strength. | 3.75 gr... | 10 gr.... | 20 gr.... | 30 gr. |
| Made up to.......... | 10 liters. | 10 liters. | 10 liters. | 10 liters. |

The goods are well dried and dyed in a dyebath of the following constitution:

*Diazo solution.*—340 grams of meta-nitro-ortho-anisidin are dissolved in 500 cc. of hydrochloric acid 20° Baumé and 3000 grams of hot water, cooled while stirring, and 3000 grams of cold water, 1000 grams of ice and 1000 grams of aluminium-sulfate are added and at 5° C. 156 grams of sodium nitrite dissolved in 500 grams of cold water are allowed to run in slowly in a thin stream, while stirring continuously, and the whole is made up with cold water to 10 liters.

*Dye-bath.*

|  | Light shades. | Medium shades. | Dark shades. |
|---|---|---|---|
| Diazo solution...................... | 750 cc... | 1250 cc.. | 2500 cc. |
| Cold water........................... | 9250 cc.. | 8.50 cc.. | 7500 cc. |
| Solution of sodium acetate (1:1).... | 30 cc.... | 50 cc.... | 100 cc. |

The exhaustion of the dye-bath must be made good by adding liquor of double concentration. In this manner excellently bright pink shades, like rhodamin, to dark red tints, like Turkey red, of a very clear aspect can be obtained.

*Example IV—Production on viscose silk of the dyestuff obtained by combining tetrazotized dianisidin with the anilid of 2:3-oxynaphthoic acid.*—The viscose silk is impregnated with the following

*Padding solution of the anilid of 2:3-oxynaphthoic acid.*

|  | Light shades. | Medium shades. | Dark shades. | Intensely dark shades. |
|---|---|---|---|---|
| Anilid of 2.3 oxynaphthoic acid. | 7.5 gr... | 20 gr.... | 40 gr.... | 60 gr. |
| Caustic soda lye of 34° Bé. | 13 cc.... | 35 cc.... | 67 cc.... | 100 cc. |
| Ricinoleate of soda or the sodium compound of Turkey red oil. | 30 gr.... | 50 gr.... | 75 gr.... | 100 gr. |
| Made up to.......... | 10 liters. | 10 liters. | 10 liters. | 10 liters. |

The goods are then dyed as described in Example I, in a dyebath of the following constitution:

*Diazo solution.*—240 grams of dianisidin base are dissolved in 210 grams of hydrochloric acid 20° Baumé and 2500 grams of boiling water; to the cooled solution are added 2000 grams of ice and 150 grams of hydrochloric acid 20° Baumé and then 160 grams of sodium nitrite dissolved in 500 grams of water are allowed to run in slowly in a thin stream, while stirring continuously. The whole is made up to 10 liters.

*Dye-bath.*

|  | Light shades. | Medium shades. | Dark shades. | Intensely dark shades. |
|---|---|---|---|---|
| Diazo solution........... | 500 cc... | 625 cc.... | 1250 cc... | 2500 cc. |
| Solution of cupric chlorid 40° Baumé. | 50 cc.... | 75 cc.... | 150 cc... | 300 cc. |
| Solution of chromic acid (1:10). | 15 cc.... | 25 cc.... | 50 cc.... | 100 cc. |
| Solution of aluminium sulfate 12° Bé. | 100 cc.... | 120 cc... | 200 cc... | 250 cc. |
| Solution of sodium acetate (1:1). | 50 cc.... | 65 cc.... | 125 cc... | 250 cc. |
| Made up to.......... | 10 liters. | 10 liters. | 10 liters. | 10 liters. |

The exhaustion of the dye-bath must be made good by adding liquor of double concentration. After dyeing the goods are well washed, twice soaped and brightened with acid. In this manner light blue to bluish black shades of an excellent intensity and beauty are obtained.

With other diazo-, tetrazo- or diazo-azo compounds not containing a sulfo group and with other arylamids of 2:3-oxynaphthoic acid the process can be correspondingly conducted. In every case excellently uniform shades of a very great brightness are obtained.

Now what I claim and desire to secure by Letters Patent is the following:

1. In the art of producing ice colors on artificial silk the improvement consisting in impregnating the artificial silk with a solution of an arylamid of 2:3-oxynaphthoic acid and treating it with a non-sulfonated diazo compound.

2. The art of dyeing artificial silk with a previously prepared non-sulfonated diazo compound, which comprises impregnating the artificial silk with a solution having a great affinity for the artificial silk, namely a solution of an arylamid of 2:3-oxynaphthoic acid, and then treating the thus impregnated artificial silk with a previously prepared non-sulfonated diazo compound, whereby the arylamid is coupled directly with the diazo compound.

That I claim the foregoing as my invention, I have signed my name in presence of two witnesses this 22nd day of July, 1914.

FELIX KUNERT.

Witnesses:
PETER LAUTENSCHLÄGER,
FRITZ DÉSOR.